United States Patent Office 3,720,651
Patented Mar. 13, 1973

3,720,651
METHOD OF MANUFACTURING A COPOLYMER OF A $C_4$ OLEFIN WITH MALEIC ANHYDRIDE
Saburo Imoto, Osamu Ohara, Hisashi Nakamoto, Hisashi Tanaka, and Ryuhei Ueeda, Kurashiki, Japan, assignors to Kuraray Co., Ltd., Kurashiki, Japan
No Drawing. Filed Apr. 9, 1971, Ser. No. 132,881
Claims priority, application Japan, May 1, 1970, 45/38,527; Nov. 17, 1970, 45/101,811
Int. Cl. C08f 1/08, 15/02
U.S. Cl. 260—78.5 R          15 Claims

ABSTRACT OF THE DISCLOSURE

A method of manufacturing a copolymer of a $C_4$ olefin with maleic anhydride is provided comprising copolymerizing an olefin selected from the group consisting of isobutene and a mixture of isobutene and other hydrocarbons which contain 4 carbon atoms with maleic anhydride in a solvent containing at least 80 weight percent of isopropyl acetate or a mixture of ethyl acetate and tert-butanol.

---

The present invention relates to a method of manufacturing a copolymer of a $C_4$ olefin with maleic anhydride. More particularly, this invention relates to an improved precipitation polymerization process wherein specific solvents or solvent mixtures are advantageously employed in the copolymerization of a $C_4$ olefin with maleic anhydride.

Copolymers have heretofore been obtained by copolymerizing isobutene with maleic anhydride in benzene or acetone, removing the solvent by filtration or centrifugation and drying the product. However, polymerization with acetone or benzene has various defects; namely, (A) the copolymer is obtained only in a block or agglomerated form, (B) smooth precipitation copolymerization is not effected, and (C) acceleration of the copolymerization is interrupted by attachment of blocks or agglomerates of the copolymer on the walls of the reactor and the blades of the stirrer. In particular, such deficiencies occur quite frequently when using a gaseous mixture containing mainly isobutene and 1-butene and/or 2-butene, generally known in the art as "return B.B.," a mixture obtained after extraction of butadiene from the $C_4$ hydrocarbon mixture obtained by decomposition of naphtha, for example, a mixture containing more than 10% of 1-butene and/or 2-butene on the basis of the amount of isobutene.

It has now been found that the above deficiencies can be overcome by using a solvent containing at least about 80 wt. percent isopropyl acetate or a mixture of ethyl acetate and tert-butanol as the solvent in the precipitation copolymerization of a $C_4$ olefin, e.g., isobutene or a mixture of isobutene and other butenes such as butene-1, trans-butene-2, and cis-butene-2, with maleic anhydride.

The solvents employed in the present process exhibit excellent solubility for the reactant monomers and insolubility for the produced copolymer; thus, the precipitation copolymerization can be effected smoothly without attachment of the produced copolymer to the walls of the reactor and/or the blades of the stirrer. In the present invention, the copolymer is neither dissolved nor rendered tacky nor agglomerated in the course of solvent removal from or drying of the copolymer. Moreover, in the present invention the copolymerization rate is rapid and copolymers exhibiting a high degree of polymerization and uniform large particle size are obtained. Of the many advantages afforded by the present invention, it is particularly advantageous that the copolymer is produced exhibiting large and uniform particle size. In this manner, the copolymer particles are not scattered in the form of fine powder; thus, no loss of the product is observed nor is there any adverse interference with the operating conditions.

In this invention, it is considered preferable to employ isopropyl acetate per se, as the solvent; however, a solvent consisting mainly of isopropyl acetate and another hydrocarbon solvent such as an aliphatic hydrocarbon, as for example, n-hexane can also suitably be employed. The amount of said other hydrocarbon solvent, e.g., n-hexane, is preferably less than 20 wt. percent on the basis of the amount of the total solvent.

A mixed solvent comprising ethyl acetate and tert-butanol can also be employed in the present invention. Generally, the mixed solvent is employed in weight ratios of ethyl acetate to tert-butanol ranging from 60 to 90 weight percent: 40 to 10 weight percent, and preferably, 70 to 80 weight percent: 30 to 20 weight percent.

Any free radical polymerization catalyst can be suitably employed in the present invention. Azobisisobutyronitrile (hereinafter referred to as "AZN"), 2,2'-azobis (2,4-dimethylvaleronitrile) and benzoyl peroxide are preferably employed.

Catalytically effective amounts of the catalyst generally range from about 0.05 to 3.0 mole percent based on the amount of maleic anhydride. Addition of the catalyst can be effected wholly in the initial stage of the polymerization or progressively during the course of the polymerization.

The polymerization can be conducted at temperatures ranging from 20° to 90° C., and preferably, 45° to 85° C. When the polymerization temperature becomes too low, the polymerization rate is very slow. When the temperature becomes too high, the molecular weight of the copolymer decreases and a remarkable elevation of the polymerization pressure is observed. A suitable pressure for polymerization is 1 to 9 kg./cm.$^2$, and preferably, 1 to 5 kg./cm.$^2$. Polymerization can occur over a period of from 1 to 15 hours, and preferably over a period of from 2 to 8 hours.

Although any ratio of olefin and maleic anhydride can be employed, more than 1 mole equivalent of olefin for maleic anhydride is preferred.

The solvent is employed in sufficient quantity to provide a final copolymer concentration ranging from 8 to 40 weight percent of the copolymer. Most preferably, sufficient solvent is employed to provide a copolymer concentration ranging from 15 to 30 weight percent.

The particle diameter of the resulting copolymer is quite large. Generally, few particles pass through a 100 mesh sieve. Copolymer particles ranging in size from 16 to 50 mesh are ordinarily obtained. The process of the present invention provides copolymers exhibiting a degree of polymerization as measured by intrinsic viscosity in dimethylformamide solution at 30° C., [$\eta$] ranging from about 0.7 to about 2.5. If desired, copolymers exhibiting a degree of polymerization less than about 0.7 can be attained depending upon the polymerization conditions.

The following examples further illustrate the present invention. Unless otherwise specified, all percentages and parts are by weight.

EXAMPLE 1

A mixed solvent (460 ml.) comprising ethyl acetate (73 weight percent) and tert-butanol (27 weight percent) and containing maleic anhydride (60 g.) and AZN (0.6 g.) was charged to an autoclave (inner volume: 1 l.) equipped with a stirrer. Nitrogen gas was introduced therein for 30 minutes. Isobutene (40 g.) and 1-butene (45 g.) were charged to the autoclave. The mixture was polymerized at 55° C. under 2.9 kg./cm.$^2$ of pressure for 6 hours with continuous stirring. When stirring was stopped, the resulting copolymer easily precipitated without attachment to the autoclave and/or blades of the stirrer. The copolymer can be maintained in a suspended state by stirring continuously.

Upon removal of the gas, the polymer was removed from the autoclave, filtered and dried to give 75 g. of a $C_4$ olefin-maleic anhydride copolymer ($[\eta]=0.750$) as a white powder having a large particle size and hardly passing through a 40 mesh sieve.

EXAMPLE 2

A mixed solvent (380 ml.) comprising ethyl acetate (75 weight percent) and tert-butanol (25 weight percent) and containing maleic anhydride (60 g.) and AZN (0.6 g.) were charged to an autoclave (inner volume: 1 l.) equipped with stirrer. Nitrogen gas was introduced therein for 30 minutes. Thereafter, isobutene (40 g.) and 1-butene (45 g.) were also charged thereto. Polymerization was effected at 55° C. under 3.2 kg./cm.$^2$ of pressure for 6 hours.

Upon removal of the gas, the copolymer was removed from the autoclave, filtered and dried to give 86 g. of copolymer ($[\eta]=0.820$) as a white powder having a large particle size hardly passing through a 30 mesh sieve.

EXAMPLE 3

Copolymerization was effected as in Example 1 except that cis-butene-2 (45 g.) was used in lieu of the butene-1 (45 g.), whereby a powdery copolymer (77 g.) was obtained.

EXAMPLE 4

A mixed solvent (460 ml.) comprising ethyl acetate (75 weight percent) and tert-butanol (25 weight percent) and containing maleic anhydride (60 g.) was charged to an autoclave (inner volume: 1 l.), and nitrogen gas was introduced for 30 minutes. There was then charged to the autoclave so-called "return B.B." (composition: 46.5 mole percent of isobutene, 22.4 mole percent of butene-1, 9.7 mole percent of trans-butene-2, 6.3 mole percent of cis-butene-2, 0.3 mole percent of 1,3-butadiene, 10.9 mole percent of n-butane, 3.0 mole percent of isobutane, 0.6 mole percent of propylene, 0.2 mole percent of propane) (85 g.) obtained from the decomposition of naphtha. Copolymerization was effected at 55° C. within the autoclave under 3.0 kg./cm.$^2$ of pressure for 8 hours with continuous stirring. After removal of the gas, the resulting copolymer was removed from the autoclave, filtered and dried to give 82 g. of copolymer ($[\eta]=0.760$) as a powder hardly passing through a 40 mesh sieve.

EXAMPLE 5

A mixed solvent (460 ml.) comprising ethyl acetate (85 weight percent) and tert-butanol (15 weight percent) and containing maleic anhydride (60 g.) and AZN (0.6 g.) was charged to an autoclave (1 l.) equipped with a stirrer. Nitrogen gas was introduced for 30 minutes. Purified isobutene (45 g.) was then charged to the autoclave. Polymerization was effected at 55° C. within the autoclave under 2.3 kg./cm.$^2$ for 6 hours with continuous stirring. When stirring was stopped, the copolymer precipitated easily without attaching or clinging to the walls of the autoclave or the blades of the stirrer. The copolymer can be kept in a suspended state with continuous stirring.

Upon removal of the gas, the polymer is removed from the autoclave, filtered and dried to give 93 g. of copolymer ($[\eta]=1.62$) as a white powder hardly passing through a 20 mesh sieve.

EXAMPLE 6

Polymerization is effected as in Example 5, except that the polymerization pressure is adjusted to 2.1 kg./cm.$^2$. As a result, the copolymer obtained was easily precipitated without attachment to the walls of the apparatus to give a copolymer product ($[\eta]=1.41$) as a powder having a large particle size hardly passing through a 30 mesh sieve.

COMPARATIVE EXAMPLE 1

Ethyl acetate (300 ml.), maleic anhydride (60 g.) and azobisisobutyronitrile (0.6 g.) were charged to an autoclave (1 l.) equipped with a stirrer. Nitrogen gas was introduced for 30 minutes. 85 g. of "return B.B." having the same composition as in Example 3 was then charged to the autoclave. Polymerization was effected at 55° C. within the autoclave for 8 hours with continuous stirring. The resulting copolymer was precipitated on the walls of the autoclave and the blades of the stirrer. Upon removal of the gas, the mixture was decanted to remove the solvent. The swelled polymer containing much solvent was scraped out, filtered under aspiration to remove the solvent and dried to give 85 g. of copolymer in block form. The copolymer in block form must be pulverized to make powder.

Polymerizations are similarly repeated using benzene and acetone respectively, in lieu of ethyl acetate, whereby the copolymer is obtained in block form as it is when using ethyl acetate.

EXAMPLE 7

460 cc. of isopropyl acetate, 60 g. of maleic anhydride and 0.6 g. of AZN were charged to a 1 l. autoclave fitted with a stirrer. Nitrogen was introduced over a period of 30 minutes. Thereafter, 40 g. of isobutene and 45 g. of 1-butene were added. The polymerization was conducted for 6 hours at a temperature of 55° C. and at a pressure of 2.9 kg./cm.$^2$ with continuous stirring. When stirring was terminated, the polymer easily settled without adhering to the autoclave or the stirring blade. The copolymer could be easily re-suspended by initiating further stirring.

After degassing, the polymer was removed from the autoclave, filtered and dried. 75 g. of a white powdered copolymer having an intrinsic viscosity $[\eta]$ of 0.750 and a particle size so large as to scarcely pass through a 40 mesh sieve was obtained.

EXAMPLE 8

380 cc. of isopropyl acetate, 60 g. of maleic anhydride and 0.6 g. of AZN were charged to a 1 l. autoclave fitted with a stirrer. Nitrogen was introduced over a period of 30 minutes. Then, 40 g. of isobutene and 45 g. of 1-butene were charged to the autoclave. The polymerization was conducted at a temperature of 55° C. and a polymerization pressure of 3.2 kg./cm.$^2$ with continuous stirring.

After degassing, the copolymer was taken out of the autoclave, filtered and dried. 86 g. of a white powdered copolymer ($[\eta]=0.820$) and having a particle size so large as to scarcely pass through a 30 mesh screen was obtained.

EXAMPLE 9

7.7 g. of powdered copolymer was obtained in the same manner as employed in Example 7 except that 45 g. of cis-2-butene was used in place of 45 g. of 1-butene.

EXAMPLE 10

460 cc. of isopropyl acetate, 60 g. of maleic anhydride and 0.6 g. of AZN were charged to a 1 l. autoclave fitted with a stirrer. The autoclave was then displaced with nitrogen for 30 minutes and then charged with 85 g. of the so-called "return B.B." (comprising 46.5% isobutene, 22.4% 1-butene, 9.7% trans-2-butene, 6.3% cis-2-butene, 0.3% 1,3-butadiene, 10.9% n-butane, 3.0% isobutane, 0.6% propylene and 0.2% propane) obtained from the cracking of naphtha. The polymerization was conducted for 8 hours at a temperature of 55° C. and a polymerization pressure of 3.0 kg./cm.$^2$ with continuous stirring. After degassing, the copolymer was removed from the autoclave, filtered and dried. 82 g. of a powdered copolymer ($[\eta]=0.760$) which scarcely passed through a 40 mesh screen was obtained.

EXAMPLE 11

460 cc. of isopropyl acetate, 60 g. of maleic anhydride and 0.6 g. of AZN were charged to a 1 l. autoclave fitted with a stirrer, then nitrogen was introduced for 30 minutes, and thereafter 45 g. of purified isobutene was added. The polymerization was conducted for 6 hours at 55° C. and at a polymerization pressure of 2.3 kg./cm.$^2$ with continuous stirring. When stirring was terminated, the copolymer easily settled without adhering to the autoclave or the stirring blade. The copolymer could be easily resuspended by continuing further agitation.

After degassing, the polymer was removed from the autoclave, filtered and dried. 93 g. of a white powdered copolymer ($[\eta]=1.62$) and a particle size so large as to scarcely pass through a 20 mesh screen was obtained.

EXAMPLE 12

Polymerization was conducted in the same manner as employed in Example 5 except that a mixed solvent obtained by adding 80 cc. of n-hexane into 380 cc. of isopropyl acetate was employed and the polymerization pressure was maintained at 2.1 kg./cm.$^2$. The resulting copolymer easily precipitated without adhering to the walls of the reactor and gave large and uniform particles of copolymer having having an intrinsic viscosity [$\eta$] of 1.41 and a particle size so large as to scarcely pass through a 30 mesh screen.

COMPARATIVE EXAMPLE 2

300 cc. of ethyl acetate, 60 g. of maleic anhydride and 0.6 g. of azobisisobutyronitrile were placed in a 1 l. autoclave fitted with a stirrer. The autoclave was then charged with nitrogen for 30 minutes and then charged with 85 g. of "return B.B." having the same composition as used in Example 3. The polymerization was conducted for 8 hours at 55° C. with continuous stirring. The resulting copolymer settled and deposited on the walls of the autoclave and on the stirring blade. After degassing, the solvent was removed by decanting, and the swelled polymer containing a large quantity of the solvent was scraped out from the autoclave, suction-filtered to remove the solvent and then dried. 85 g. of a copolymer in block form was obtained. The block of copolymer thus obtained required grinding in order to afford particulate polymer.

Polymerizations were conducted in the same manner using benzene and acetone, respectively, in place of ethyl acetate. Copolymers in block form were obtained just as in the case of using ethyl acetate.

What is claimed is:

1. A method of manufacturing a copolymer of an olefin having 4 carbon atoms with maleic anhydride, which comprises copolymerizing an olefin selected from the group consisting of isobutene and a mixture of isobutene and other hydrocarbons which have 4 carbon atoms with maleic anhydride, in the presence of a free radical polymerization catalyst, in a solvent selected from the group consisting of (1) a solvent containing at least 80 weight percent of isopropyl acetate, the balance being an aliphatic hydrocarbon and (2) a mixed solvent of 60 to 90 weight percent of ethyl acetate and 40 to 10 weight percent of tert-butanol, said solvent being employed in sufficient amount to provide a polymer concentration of from 8 to 40 weight percent.

2. The method of claim 1 wherein the solvent is isopropyl acetate.

3. The method of claim 1 wherein the solvent is a mixed solvent comprising at least 80 weight percent isopropyl acetate and the balance being an aliphatic hydrocarbon.

4. The method of claim 3 wherein the aliphatic hydrocarbon is n-hexane.

5. The method of claim 1 wherein the solvent is a mixed solvent of 60 to 90 weight percent of ethyl acetate and 40 to 10 weight percent of tert-butanol.

6. The method of claim 5 wherein the solvent is a mixed solvent of 70 to 84 weight percent of ethyl acetate and 30 to 20 weight percent of tert-butanol.

7. The method of claim 1 wherein the polymerization catalyst is selected from the group consisting of azobisisobutyronitrile, 2,2'-azobis-(2,4 - dimethylvaleronitrile) and benzoyl peroxide.

8. The method of claim 7 wherein the catalyst is employed in amounts ranging from 0.05 to 3.0 mole percent based on the amount of maleic anhydride employed.

9. The method of claim 1 wherein the copolymerization is conducted at temperatures ranging from 20° to 90° C.

10. The method of claim 1 wherein the copolymerization is conducted at pressures ranging from 1 to 9 kg./cm.$^2$.

11. The method of claim 1 wherein the copolymerization is conducted over a period of from 1 to 15 hours.

12. The method of claim 1 wherein the copolymerization is conducted in the presence of sufficient solvent to render the concentration of the resulting copolymer in the solvent between about 8 to 40 weight percent.

13. A method of manufacturing a copolymer of an olefin having 4 carbon atoms with maleic anhydride which comprises copolymerizing isobutene or a mixture of isobutene and other butenes with maleic anhydride, in the presence of azobisisobutyronitrile as a catalyst, in isopropyl acetate solvent, said solvent being employed in sufficient amount to provide a polymer concentration of from 8 to 40 weight percent.

14. The method of claim 13 wherein the copolymerization is conducted at temperatures ranging from 20° to 90° C.

15. The method of claim 13 wherein the copolymerization is conducted at pressures ranging from 1 to 9 kg./cm.$^2$.

References Cited

UNITED STATES PATENTS

| | | | |
|---|---|---|---|
| 3,053,814 | 9/1962 | Hedrick | 260—78.5 |
| 3,178,395 | 4/1965 | Muskat | 260—78.5 |
| 3,560,457 | 2/1971 | Hazen et al. | 260—78.5 |

JAMES A. SEIDLECK, Primary Examiner

J. KNIGHT III, Assistant Examiner

UNITED STATES PATENT OFFICE
CERTIFICATE OF CORRECTION

Patent No. 3,720,651  Dated March 13, 1973

Inventor(s) Saburo Imoto et al

It is certified that error appears in the above-identified patent and that said Letters Patent are hereby corrected as shown below:

Column 3, line 35, Insert -- and AZN (0.6g) -- after "(60 g)".

Column 5, line 28, Delete the word "having" after the first "having".

Signed and sealed this 24th day of September 1974.

(SEAL)
Attest:

McCOY M. GIBSON JR.
Attesting Officer

C. MARSHALL DANN
Commissioner of Patents